United States Patent
Al Herz et al.

(10) Patent No.: US 11,230,672 B1
(45) Date of Patent: Jan. 25, 2022

(54) PROCESSES FOR PRODUCING PETROCHEMICAL PRODUCTS THAT UTILIZE FLUID CATALYTIC CRACKING

(71) Applicant: Saudi Arabian Oil Company, Dhahran (SA)

(72) Inventors: Mansour Ali Al Herz, Al-Ahsa (SA); Abdennour Bourane, Dhahran (SA); Ali Al Jawad, Al-Qatif (SA); Alberto Lozano Ballesteros, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/009,048

(22) Filed: Sep. 1, 2020

(51) Int. Cl.
*C10G 47/30* (2006.01)
*C10G 51/02* (2006.01)
*B01J 29/90* (2006.01)
*B01J 29/08* (2006.01)
*B01J 29/40* (2006.01)

(52) U.S. Cl.
CPC .......... *C10G 51/026* (2013.01); *B01J 29/08* (2013.01); *B01J 29/40* (2013.01); *B01J 29/90* (2013.01); *C10G 2300/104* (2013.01); *C10G 2300/1044* (2013.01); *C10G 2300/1048* (2013.01); *C10G 2400/20* (2013.01); *C10G 2400/22* (2013.01)

(58) Field of Classification Search
CPC .......... C10G 47/30; C10G 2300/1044; C10G 2300/1055; C10G 2300/1059; C10G 2300/4006
See application file for complete search history.

(56) References Cited

U.S. PATENT DOCUMENTS

| | | |
|---|---|---|
| 977,228 A | 11/1910 | Schestopol |
| 2,882,218 A | 4/1959 | Jewell |
| 3,074,878 A | 1/1963 | Pappas |
| 3,835,029 A | 9/1974 | Larson |
| 3,837,822 A | 9/1974 | Ward |
| 3,856,659 A | 12/1974 | Owen |
| 3,888,762 A | 6/1975 | Gerhold |
| 4,090,949 A | 5/1978 | Owen et al. |
| 4,297,203 A | 10/1981 | Ford et al. |
| 4,417,975 A | 11/1983 | Myers |
| 4,419,221 A | 12/1983 | Castagnos et al. |
| 4,436,613 A | 3/1984 | Sayles et al. |
| 4,464,250 A | 8/1984 | Myers et al. |
| 4,606,810 A | 8/1986 | Krambeck et al. |
| 4,830,728 A | 5/1989 | Herbst et al. |
| 4,980,053 A | 12/1990 | Li et al. |
| 4,992,160 A | 2/1991 | Long et al. |
| 5,026,935 A | 6/1991 | Leyshon et al. |
| 5,026,936 A | 6/1991 | Leyshon et al. |
| 5,043,522 A | 8/1991 | Leyshon et al. |
| 5,154,818 A | 10/1992 | Harandi et al. |
| 5,158,919 A | 10/1992 | Haddad et al. |
| 5,160,424 A | 11/1992 | Le et al. |
| 5,171,921 A | 12/1992 | Gaffney et al. |
| 5,232,580 A | 8/1993 | Le et al. |
| 5,232,675 A | 8/1993 | Shu et al. |
| 5,318,689 A | 6/1994 | Hsing et al. |
| 5,326,465 A | 7/1994 | Yongqing et al. |
| 5,334,554 A | 8/1994 | Lin et al. |
| 5,372,704 A | 12/1994 | Harandi et al. |
| 5,380,690 A | 1/1995 | Zhicheng et al. |
| 5,451,313 A | 9/1995 | Wegerer et al. |
| 5,462,652 A | 10/1995 | Wegerer |
| 5,523,502 A | 6/1996 | Rubin |
| 5,549,813 A | 8/1996 | Dai et al. |
| 5,589,139 A | 12/1996 | Zinke et al. |
| 5,597,537 A | 1/1997 | Wegerer et al. |
| 5,637,207 A | 6/1997 | Hsing et al. |
| 5,670,037 A | 9/1997 | Zaiting et al. |
| 5,685,972 A | 11/1997 | Timken et al. |
| 5,730,859 A | 3/1998 | Johnson et al. |
| 5,770,042 A | 6/1998 | Galperin et al. |
| 5,858,207 A | 1/1999 | Lomas |
| 5,904,837 A | 5/1999 | Fujiyama |
| 5,951,850 A | 9/1999 | Ino et al. |

(Continued)

FOREIGN PATENT DOCUMENTS

| | | |
|---|---|---|
| CN | 1710029 A | 12/2005 |
| CN | 102925210 A | 2/2013 |

(Continued)

OTHER PUBLICATIONS

Office Action dated Mar. 16, 2021 pertaining to U.S. Appl. No. 17/009,073, filed Sep. 1, 2020, 27 pgs.
Corma, "A new continuous laboratory reactor for the study of catalytic cracking", Applied Catalysis A: General 232, pp. 247-263, 2002.
International Search Report and Written Opinion pertaining to International Application PCT/US2018/030858 dated May 3, 2018.
Corma et al., "Different process schemes for converting light straight run and fluid catalytic cracing naphthas in a FCC unit for maximum propylene production", Applied Catalyst A: General 265, pp. 195-206, 2004.

(Continued)

*Primary Examiner* — Randy Boyer
(74) *Attorney, Agent, or Firm* — Dinsmore & Shol LLP

(57) ABSTRACT

According to one more embodiments, petrochemical products may be produced from a hydrocarbon material by a process that may comprise separating the hydrocarbon material into at least a lesser boiling point fraction, a medium boiling point fraction, and a greater boiling point fraction. The process may further comprise cracking at least a portion of the lesser boiling point fraction and the medium boiling point fraction in a second reactor unit in the presence of a second catalyst at a reaction temperature of from 500° C. to 700° C. to produce a second cracking reaction product, wherein the lesser boiling point fraction enters the second reactor unit upstream of wherein the medium boiling point fraction enters the second reactor.

20 Claims, 3 Drawing Sheets

(56) References Cited

U.S. PATENT DOCUMENTS

| | | |
|---|---|---|
| 5,976,356 A | 11/1999 | Drake et al. |
| 5,993,642 A | 11/1999 | Mohr et al. |
| 6,015,933 A | 1/2000 | Abrevaya et al. |
| 6,069,287 A | 5/2000 | Ladwig et al. |
| 6,210,562 B1 | 4/2001 | Xie et al. |
| 6,287,522 B1 | 9/2001 | Lomas |
| 6,288,298 B1 | 9/2001 | Rodriguez et al. |
| 6,300,537 B1 | 10/2001 | Strohmaier et al. |
| 6,315,890 B1 | 11/2001 | Ladwig et al. |
| 6,420,621 B2 | 7/2002 | Sha et al. |
| 6,455,750 B1 | 9/2002 | Steffens et al. |
| 6,521,563 B2 | 2/2003 | Strohmaier et al. |
| 6,548,725 B2 | 4/2003 | Froment et al. |
| 6,566,293 B1 | 5/2003 | Vogt et al. |
| 6,602,403 B1 | 8/2003 | Steffens et al. |
| 6,652,737 B2 | 11/2003 | Touvelle et al. |
| 6,656,345 B1 | 12/2003 | Chen et al. |
| 6,656,346 B2 | 12/2003 | Ino et al. |
| 6,784,329 B2 | 8/2004 | O'Rear et al. |
| 6,867,341 B1 | 3/2005 | Abrevaya et al. |
| 6,979,755 B2 | 12/2005 | O'Rear et al. |
| 7,019,187 B2 | 3/2006 | Powers |
| 7,029,571 B1 | 4/2006 | Bhattacharyya et al. |
| 7,087,154 B2 | 8/2006 | Pinho et al. |
| 7,087,155 B1 | 8/2006 | Dath et al. |
| 7,128,827 B2 | 10/2006 | Tallman et al. |
| 7,153,479 B2 | 12/2006 | Peterson et al. |
| 7,169,293 B2 | 1/2007 | Lomas et al. |
| 7,220,351 B1 | 5/2007 | Pontier et al. |
| 7,261,807 B2 | 8/2007 | Henry et al. |
| 7,270,739 B2 | 9/2007 | Chen et al. |
| 7,312,370 B2 | 12/2007 | Pittman et al. |
| 7,314,964 B2 | 1/2008 | Abrevaya et al. |
| 7,326,332 B2 | 2/2008 | Chen et al. |
| 7,374,660 B2 | 5/2008 | Steffens et al. |
| 7,459,596 B1 | 12/2008 | Abrevaya et al. |
| 7,479,218 B2 | 1/2009 | Letzsch |
| 7,686,942 B2 | 3/2010 | Xie et al. |
| 7,906,077 B2 | 3/2011 | Sandacz |
| 7,935,654 B2 | 5/2011 | Choi et al. |
| 8,137,533 B2 | 3/2012 | Towler et al. |
| 8,247,631 B2 | 8/2012 | Nicholas et al. |
| 8,614,160 B2 | 12/2013 | Upson et al. |
| 8,864,979 B2 | 10/2014 | Palmas |
| 8,933,286 B2 | 1/2015 | Souza et al. |
| 9,096,806 B2 | 8/2015 | Abba et al. |
| 9,101,854 B2 | 8/2015 | Koseoglu et al. |
| 9,290,705 B2 | 3/2016 | Bourane et al. |
| 9,783,749 B2 | 10/2017 | Davydov |
| 9,816,037 B2 | 11/2017 | Avais |
| 2001/0042700 A1 | 11/2001 | Swan, III et al. |
| 2001/0056217 A1 | 12/2001 | Froment et al. |
| 2002/0003103 A1 | 1/2002 | Henry et al. |
| 2003/0220530 A1 | 11/2003 | Boelt et al. |
| 2005/0070422 A1 | 3/2005 | Chen et al. |
| 2005/0150817 A1 | 7/2005 | Tallman et al. |
| 2006/0108260 A1 | 5/2006 | Henry |
| 2008/0011644 A1 | 1/2008 | Dean et al. |
| 2008/0011645 A1 | 1/2008 | Dean |
| 2008/0035527 A1* | 2/2008 | Eng .................... C10G 11/18 208/113 |
| 2008/0044611 A1 | 2/2008 | Husemann et al. |
| 2009/0012339 A1 | 1/2009 | Choi et al. |
| 2009/0112035 A1 | 4/2009 | Choi et al. |
| 2009/0288990 A1 | 11/2009 | Xie et al. |
| 2011/0139679 A1 | 6/2011 | Bories et al. |
| 2012/0241359 A1 | 9/2012 | Al-Thubaiti et al. |
| 2013/0001130 A1 | 1/2013 | Mo |
| 2013/0056393 A1 | 3/2013 | Subramani et al. |
| 2013/0172643 A1 | 7/2013 | Pradeep et al. |
| 2013/0248420 A1 | 9/2013 | Palmas |
| 2013/0248421 A1 | 9/2013 | Abba et al. |
| 2014/0110308 A1 | 4/2014 | Bourane et al. |
| 2014/0228205 A1 | 8/2014 | Narayanaswamy et al. |
| 2015/0094511 A1 | 4/2015 | Bastianti et al. |
| 2016/0333280 A1 | 11/2016 | Subramani et al. |
| 2017/0130140 A1 | 5/2017 | Bhanuprasad et al. |
| 2017/0190991 A1 | 7/2017 | Sundberg et al. |
| 2018/0057758 A1 | 3/2018 | Al-Ghamdi et al. |
| 2018/0079974 A1 | 3/2018 | Kokayeff et al. |
| 2018/0142167 A1 | 5/2018 | Al-Ghamdi et al. |
| 2018/0223193 A1 | 8/2018 | Kukade et al. |
| 2018/0305623 A1 | 10/2018 | Al-Ghrami et al. |
| 2018/0327677 A1 | 11/2018 | Ding et al. |
| 2018/0346827 A1 | 12/2018 | Al-Ghamdi et al. |
| 2019/0119586 A1 | 4/2019 | Gong et al. |
| 2019/0225894 A1 | 7/2019 | Bourane et al. |
| 2020/0255753 A1 | 8/2020 | Al-Herz et al. |
| 2021/0047573 A1 | 2/2021 | Bourane et al. |

FOREIGN PATENT DOCUMENTS

| | | |
|---|---|---|
| EP | 315179 A1 | 5/1989 |
| EP | 2688982 A1 | 1/2014 |
| GB | 978576 | 12/1964 |
| WO | 2010053482 A1 | 5/2010 |
| WO | 2012128973 A1 | 9/2012 |
| WO | 2016096502 A1 | 6/2016 |
| WO | 2016096970 A1 | 6/2016 |
| WO | 2019106921 A1 | 6/2019 |

OTHER PUBLICATIONS

Verstraete et al., "Study of direct and indirect naphtha recycling to a resid FCC unit for maximum propylene production", Catalysis Today, 106, pp. 62-71, 2005.

International Search Report and Written Opinion dated Apr. 4, 2019 pertaining to International application No. PCT/US2019/013978 filed Jan. 17, 2019, 19 pgs.

Corma et al., "Steam catalytic cracking of naphtha over ZSM-5 zeolite for production of propene and ethene: Micro and mascroscopic implications of the presence of steam", Applied Catalysis A: General 417-418, pp. 220-235, 2012.

Examination Report pertaining to Application No. GC2018-35391 dated Nov. 27, 2019.

Office Action dated Nov. 15, 2019 pertaining to U.S. Appl. No. 16/244,181, filed Jan. 10, 2019, 41 pgs.

Office Action dated May 13, 2020 pertaining to U.S. Appl. No. 15/945,362, filed Apr. 4, 2018, 55 pgs.

Office Action dated May 26, 2020 pertaining to U.S. Appl. No. 16/244,181, filed Jan. 10, 2019, 22 pgs.

Notice of Allowance dated Aug. 19, 2020 pertaining to U.S. Appl. No. 15/945,362, filed Apr. 4, 2018, 9 pgs.

Notice of Allowance dated Sep. 4, 2020 pertaining to U.S. Appl. No. 16/244,181, filed Jan. 10, 2019, 15 pgs.

International Search Report and Written Opinion dated Jun. 16, 2021 pertaining to International application No. PCT/US2021/015030 filed Jan. 26, 2021, 15 pages.

Office Action dated Jul. 6, 2021 pertaining to U.S. Appl. No. 17/009,020, filed Sep. 1, 2020, 41 pages.

Office Action dated Jul. 2, 2021 pertaining to U.S. Appl. No. 17/009,073, filed Sep. 1, 2020, 18 pages.

International Search Report and Written Opinion dated May 3, 2021 pertaining to International application No. PCT/US2021/015012 filed Jan. 26, 2021, 12 pages.

International Search Report and Written Opinion dated May 3, 2021 pertaining to International application No. PCT/US2021/015007 filed Jan. 26, 2021, 15 pages.

International Search Report and Written Opinion dated May 3, 2021 pertaining to International application No. PCT/US2021/015010 filed Jan. 26, 2021, 13 pages.

International Search Report and Written Opinion dated May 10, 2021 pertaining to International application No. PCT/US2021/015013 filed Jan. 26, 2021, 14 pages.

International Search Report and Written Opinion dated May 10, 2021 pertaining to International application No. PCT/US2021/015035 filed Jan. 26, 2021, 15 pages.

International Search Report and Written Opinion dated May 10, 2021 pertaining to International application No. PCT/US2021/015019 filed Jan. 26, 2021, 15 pages.

(56) References Cited

OTHER PUBLICATIONS

Office Action dated Jun. 7, 2021 pertaining to U.S. Appl. No. 17/009,008, filed Sep. 1, 2020, 28 pages.
Office Action dated Jun. 10, 2021 pertaining to U.S. Appl. No. 17/009,039, filed Sep. 1, 2020, 39 pages.
Office Action dated May 26, 2021 pertaining to U.S. Appl. No. 17/009,012, filed Sep. 1, 2020, 37 pages.

* cited by examiner

PROCESSES FOR PRODUCING PETROCHEMICAL PRODUCTS THAT UTILIZE FLUID CATALYTIC CRACKING

TECHNICAL FIELD

Embodiments of the present disclosure generally relate to chemical processing and, more specifically, to process and systems utilizing fluid catalytic cracking to form olefins.

BACKGROUND

Ethylene, propene, butene, butadiene, and aromatics compounds such as benzene, toluene and xylenes are basic intermediates for a large proportion of the petrochemical industry. They are usually obtained through the thermal cracking (or steam pyrolysis) of petroleum gases and distillates such as naphtha, kerosene or even gas oil. These compounds are also produced through refinery fluidized catalytic cracking (FCC) process where classical heavy feedstocks such as gas oils or residues are converted. Typical FCC feedstocks range from hydrocracked bottoms to heavy feed fractions such as vacuum gas oil and atmospheric residue; however, these feedstocks are limited. The second most important source for propene production is currently refinery propene from FCC units. With the ever growing demand, FCC unit owners look increasingly to the petrochemicals market to boost their revenues by taking advantage of economic opportunities that arise in the propene market.

The worldwide increasing demand for light olefins remains a major challenge for many integrated refineries. In particular, the production of some valuable light olefins such as ethylene, propene, and butene has attracted increased attention as pure olefin streams are considered the building blocks for polymer synthesis. The production of light olefins depends on several process variables like the feed type, operating conditions, and the type of catalyst.

SUMMARY

Despite the options available for producing a greater yield of propene and other light olefins, intense research activity in this field is still being conducted. These options include the use of high severity fluid catalytic cracking ("HSFCC") systems, developing more selective catalysts for the process, and enhancing the configuration of the process in favor of more advantageous reaction conditions and yields. The HSFCC process, in some embodiments, may be capable of producing yields of propene up to four times greater than the traditional fluid catalytic cracking unit and greater conversion levels for a range of petroleum steams. Embodiments of the present disclosure are directed to improved HSFCC systems and processes for producing one or more petrochemical products from a hydrocarbon material, such as a crude oil.

In one or more embodiments presently described, two FCC reactors, which may be downers, may be utilized for cracking of a hydrocarbon stream such as crude oil. According to embodiments presently disclosed, it has been recognized that separating the feed stream into at least three fractions may enhance product yields. In one or more embodiments, a lesser and medium boiling point fraction of the feed stream may be introduced into a first reactor, and a heavy boiling point fraction may be introduced into a second reactor. The lesser boiling point fraction may enter the reactor upstream of the medium boiling point fraction. In some embodiments, this arrangement may result in the lesser boiling point fraction being exposed to greater temperatures, greater catalyst to oil ratios, and/or greater residence time than the medium boiling point fraction. The varying reaction conditions of the lesser boiling point fraction and medium boiling point fraction may improve light olefin yields. Light olefin yields may be increased as compared to embodiments where only two fractions of feed oil are processed.

According to one or more embodiments, petrochemical products may be produced from a hydrocarbon material by a process that may comprise separating the hydrocarbon material into at least a lesser boiling point fraction, a medium boiling point fraction, and a greater boiling point fraction. The process may further comprise cracking at least a portion of the greater boiling point fraction in the presence of a first catalyst in a first reactor unit at a reaction temperature of from 500° C. to 700° C. to produce a first cracking reaction product. The process may further comprise cracking at least a portion of the lesser boiling point fraction and the medium boiling point fraction in a second reactor unit in the presence of a second catalyst at a reaction temperature of from 500° C. to 700° C. to produce a second cracking reaction product, wherein the lesser boiling point fraction enters the second reactor unit upstream of wherein the medium boiling point fraction enters the second reactor. The process may further comprise separating the petrochemical products from one or both of the first cracking reaction product or the second cracking reaction product.

According to one or more additional embodiments, a petrochemical product stream may be produced from a hydrocarbon feed stream by a process that may comprise introducing the hydrocarbon feed stream to a feed separator, and separating the hydrocarbon feed stream into at least a lesser boiling point fraction stream, a medium boiling point fraction stream, and a greater boiling point fraction stream in the feed separator. The process may further comprise passing the greater boiling point fraction stream to a first fluidized catalytic cracking unit, and passing the lesser boiling point fraction stream and the medium boiling point fraction stream to a second fluidized catalytic cracking unit, wherein the lesser boiling point fraction stream is passed into the second fluidized catalytic cracking unit upstream of the medium boiling point fraction stream. The process may further comprise cracking at least a portion of the greater boiling point fraction stream in the first fluidized catalytic cracking unit in the presence of a first catalyst at a reaction temperature of from 500° C. to 700° C. to produce a first cracking reaction product stream. The process may further comprise cracking at least a portion of the lesser boiling point fraction stream and the medium boiling point fraction stream in the second fluidized catalytic cracking unit in the presence of a second catalyst and at a reaction temperature of from 500° C. to 700° C. to produce a second cracking reaction product stream. The process may further comprise separating the petrochemical product stream from one or both of the first cracking reaction product stream or the second cracking reaction product stream.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
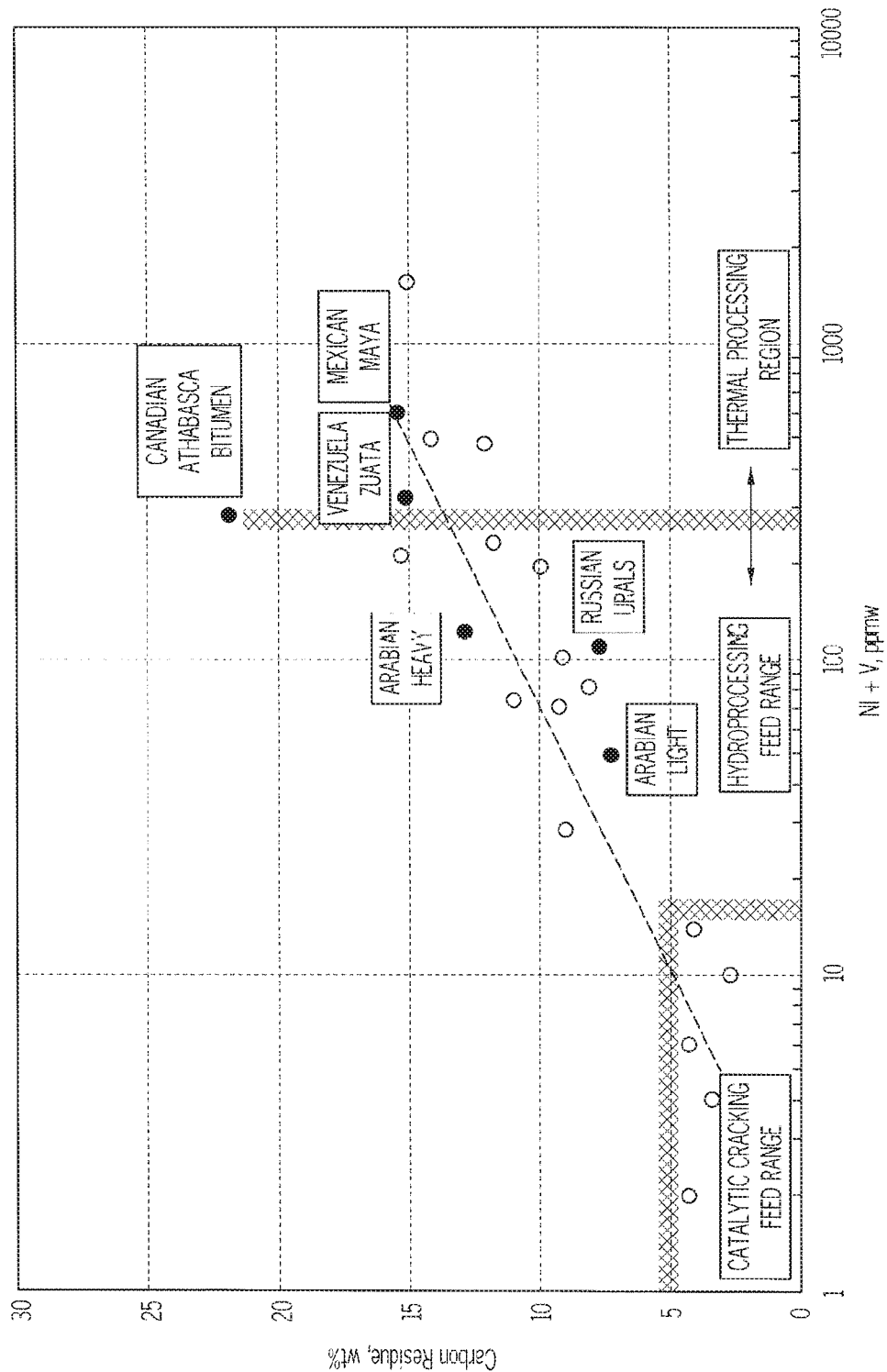
FIG. 1 graphically depicts relative properties of various hydrocarbon feed streams used for producing one or more petrochemical products, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the stream signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

One or more embodiments of the present disclosure are directed to systems and processes for converting one or more hydrocarbon feed streams into one or more petrochemical products using a high-severity fluidized catalytic cracking (HSFCC) system that includes two downflow fluid catalytic cracking (FCC) units operated at high-severity conditions. For example, a process for producing petrochemical products from a hydrocarbon material having a first FCC reactor unit and a second FCC reactor unit may include separating the hydrocarbon material into at least a lesser boiling point fraction, a medium boiling point fraction, and a greater boiling point fraction. The process may further include cracking at least a portion of the greater boiling point fraction in the presence of a first catalyst at a reaction temperature of from 500° C. to 700° C. to produce a first cracking reaction product. The process may include cracking at least a portion of the lesser boiling point fraction and the medium boiling point fraction in the presence of a second catalyst at a reaction temperature of from 500° C. to 700° C. to produce a second cracking reaction product. The process may further include separating the petrochemical products from one or both of the first cracking reaction product or the second cracking reaction product.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction" (sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as a "medium boiling point fraction."

As used in this disclosure, the term "high-severity conditions" generally refers to FCC temperatures of 500° C. or greater, a weight ratio of catalyst to hydrocarbon (catalyst to oil ratio) of equal to or greater than 5:1, and a residence time of less than 3 seconds, all of which may be more severe than typical FCC reaction conditions.

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, a "catalyst" refers to any substance that increases the rate of a specific chemical reaction. Catalysts described in this disclosure may be utilized to promote various reactions, such as, but not limited to, cracking (including aromatic cracking), demetalization, desulfurization, and denitrogenation. As used in this disclosure, "cracking" generally refers to a chemical reaction where carbon-carbon bonds are broken. For example, a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

As used in this disclosure, the term "first catalyst" refers to catalyst that is introduced to the first cracking reaction zone, such as the catalyst passed from the first catalyst mixing zone to the first cracking reaction zone. The first catalyst may include at least one of regenerated catalyst, spent first catalyst, spent second catalyst, fresh catalyst, or combinations of these. As used in this disclosure, the term "second catalyst" refers to catalyst that is introduced to the second cracking reaction zone, such as the catalyst passed from the second catalyst mixing zone to the second cracking reaction zone for example. The second catalyst may include at least one of regenerated catalyst, spent first catalyst, spent second catalyst, fresh catalyst, or combinations of these.

As used in this disclosure, the term "spent catalyst" refers to catalyst that has been introduced to and passed through a cracking reaction zone to crack a hydrocarbon material, such as the greater boiling point fraction or the lesser boiling point fraction for example, but has not been regenerated in the regenerator following introduction to the cracking reaction zone. The "spent catalyst" may have coke deposited on the catalyst and may include partially coked catalyst as well as fully coked catalysts. The amount of coke deposited on the "spent catalyst" may be greater than the amount of coke remaining on the regenerated catalyst following regeneration.

As used in this disclosure, the term "regenerated catalyst" refers to catalyst that has been introduced to a cracking reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lesser catalytic activity compared to fresh catalyst that has not passed through a cracking reaction zone and regenerator.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "propylene stream" passing from a first system component to a second system component should be understood to equivalently disclose "propylene" passing from a first system component to a second system component, and the like.

Figure 2:
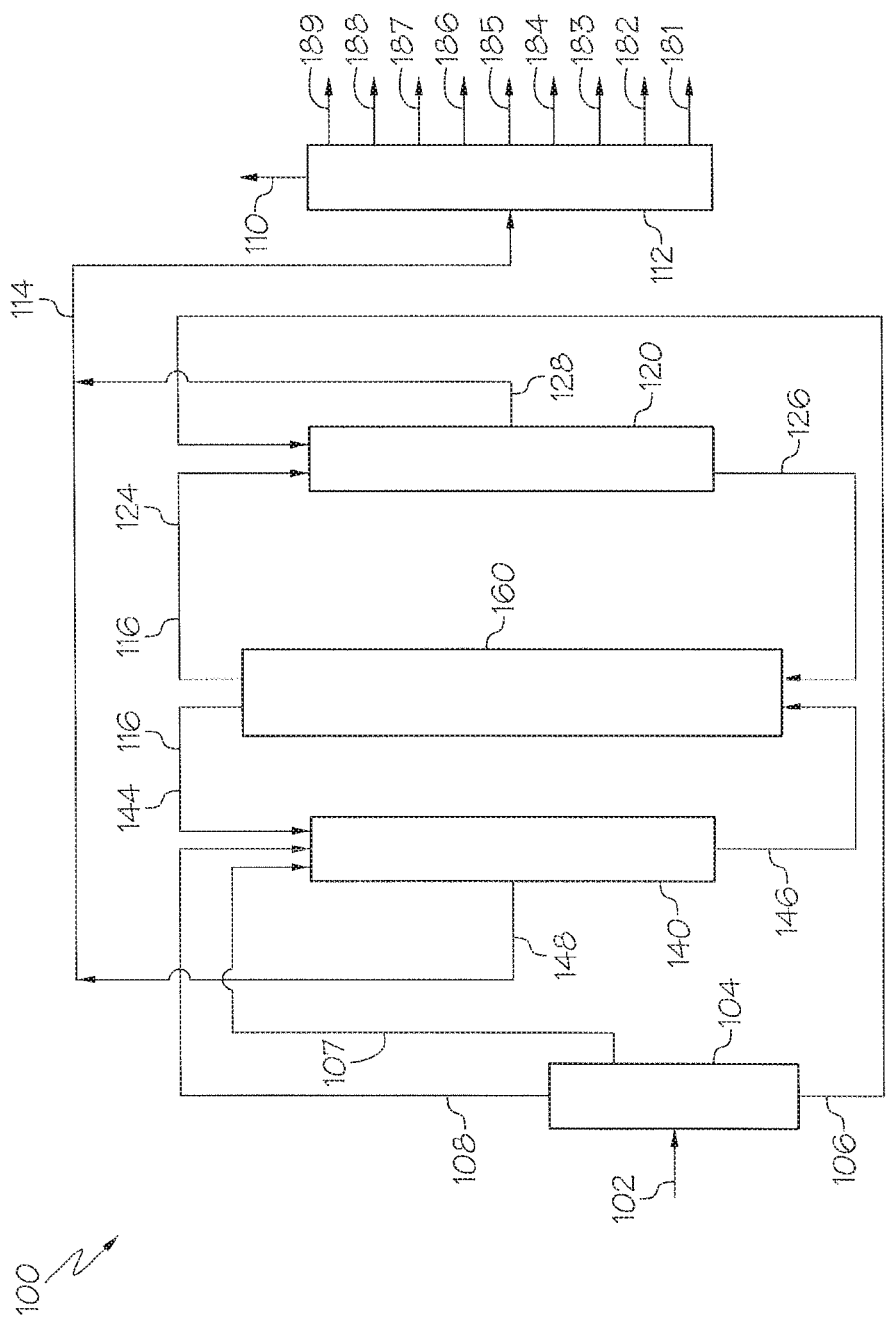
FIG. 2 is a generalized schematic diagram of a hydrocarbon feed conversion system, according to one or more embodiments described in this disclosure.

Referring to FIG. 2, the hydrocarbon feed stream 102 may generally comprise a hydrocarbon material. In embodiments, the hydrocarbon material of the hydrocarbon feed stream may be crude oil. As used in this disclosure, the term "crude oil" is to be understood to mean a mixture of petroleum liquids, gases, or combinations of liquids and gases, including some embodiments impurities such as sulfur-containing compounds, nitrogen-containing compounds and metal compounds that has not undergone significant separation or reaction processes. Crude oils are distinguished from fractions of crude oil. In certain embodiments the crude oil feedstock may be a minimally treated light crude oil to provide a crude oil feedstock having total metals (Ni+V) content of less than 20 parts per million by weight (ppmw) and Conradson carbon residue of less than 10 wt %. Such minimally treated materials may be considered crude oils as described herein.

Figure 3:
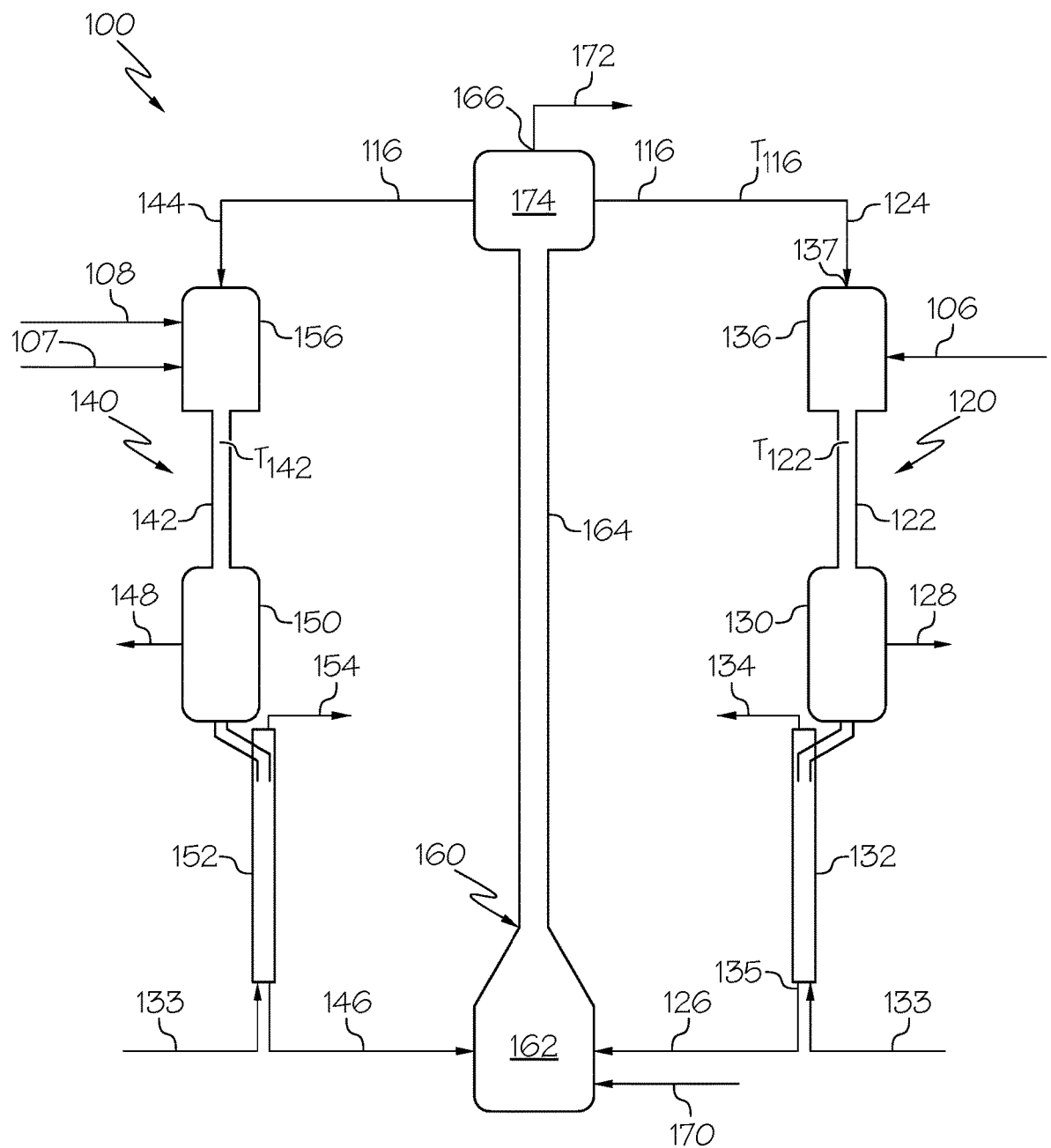
FIG. 3 depicts a schematic diagram of at least a portion of the hydrocarbon feed conversion system of FIG. 2, according to one or more embodiments described in this disclosure.

While the present description and examples may specify crude oil as the hydrocarbon material of the hydrocarbon feed stream 102, it should be understood that the hydrocarbon feed conversion systems 100 described with respect to the embodiments of FIGS. 2-3, respectively, may be applicable for the conversion of a wide variety of hydrocarbon materials, which may be present in the hydrocarbon feed stream 102, including, but not limited to, crude oil, vacuum residue, tar sands, bitumen, atmospheric residue, vacuum gas oils, demetalized oils, naphtha streams, other hydrocarbon streams, or combinations of these materials. The hydrocarbon feed stream 102 may include one or more non-hydrocarbon constituents, such as one or more heavy metals, sulphur compounds, nitrogen compounds, inorganic components, or other non-hydrocarbon compounds. If the hydrocarbon feed stream 102 is crude oil, it may have an American Petroleum Institute (API) gravity of from 22 degrees to 40 degrees. For example, the hydrocarbon feed stream 102 utilized may be an Arab heavy crude oil. (API gravity of approximately 28°), Arab medium (API gravity of approximately 30°), Arab light (API gravity of approximately 33°), or Arab extra light (API gravity of approximately 39°). Example properties for one particular grade of Arab heavy crude oil are provided subsequently in Table 1. It should be understood that, as used in this disclosure, a "hydrocarbon feed" may refer to a raw hydrocarbon material which has not been previously treated, separated, or otherwise refined (such as crude oil) or may refer to a hydrocarbon material which has undergone some degree of processing, such as treatment, separation, reaction, purifying, or other operation, prior to being introduced to the hydrocarbon feed conversion system 100 in the hydrocarbon feed stream 102.

TABLE 1

Example of Arab Heavy Export Feedstock

| Analysis | Units | Value |
|---|---|---|
| American Petroleum Institute (API) gravity | degree | 27 |
| Density | grams per cubic centimeter (g/cm$^3$) | 0.8904 |
| Sulfur Content | weight percent (wt. %) | 2.83 |
| Nickel | parts per million by weight (ppmw) | 16.4 |
| Vanadium | ppmw | 56.4 |
| Sodium Chloride (NaCl) Content | ppmw | <5 |
| Conradson Carbon Residue (CCR) | wt. % | 8.2 |
| C$_5$ Asphaltenes | wt. % | 7.8 |
| C$_7$ Asphaltenes | wt. % | 4.2 |

In general, the contents of the hydrocarbon feed stream 102 may include a relatively wide variety of chemical species based on boiling point. For example, the hydrocarbon feed stream 102 may have composition such that the difference between the 5 wt. % boiling point and the 95 wt. % boiling point of the hydrocarbon feed stream 102 is at least 100° C., at least 200° C., at least 300° C., at least 400° C., at least 500° C., or even at least 600° C.

Referring to FIG. 1, various hydrocarbon feed streams to be converted in a conventional FCC process are generally required to satisfy certain criteria in terms of the metals content and the Conradson Carbon Residue (CCR) or Ramsbottom carbon content. The CCR of a feed material is a measurement of the residual carbonaceous materials that remain after evaporation and pyrolysis of the feed material. Greater metals content and CCR of a feed stream may lead to more rapid deactivation of the catalyst. For greater levels of CCR, more energy may be needed in the regeneration step to regenerate the catalyst. For example, certain hydrocarbon feeds, such as residual oils, contain refractory components such as polycyclic aromatics which are difficult to crack and promote coke formation in addition to the coke formed during the catalytic cracking reaction. Because of the greater levels of CCR of these certain hydrocarbon feeds, the burning load on the regenerator is increased to remove the coke and residue from the spent catalysts to transform the spent catalysts to regenerated catalysts. This requires modification of the regenerator to be able to withstand the increase burning load without experiencing material failure. In addition, certain hydrocarbon feeds to the FCC may contain large amounts of metals, such as nickel, vanadium, or other metals for example, which may rapidly deactivate the catalyst during the cracking reaction process.

Referring now to FIGS. 2 and 3, in general terms, the hydrocarbon feed conversion system 100 includes two FCC units in each of which a portion of the hydrocarbon feed stream 102 contacts heated fluidized catalytic particles in a cracking reaction zone maintained at high-severity temperatures and pressures. When the portion of the hydrocarbon feed stream 102 contacts the hot catalyst and is cracked to lighter products, carbonaceous deposits, commonly referred to as coke, form on the catalyst. The coke deposits formed on the catalyst may reduce the catalytic activity of the catalyst or deactivate the catalyst. Deactivation of the catalyst may result in the catalyst becoming catalytically ineffective. The spent catalyst having coke deposits may be separated from the cracking reaction products, stripped of removable hydrocarbons, and passed to a regeneration process where the coke is burned from the catalyst in the presence of air to produce a regenerated catalyst that is catalytically effective. The term "catalytically effective" refers to the ability of the regenerated catalyst to increase the rate of cracking reactions. The term "catalytic activity" refers to the degree to which the regenerated catalyst increases the rate of the cracking reactions and may be related to a number of catalytically active sites available on the catalyst. For example, coke deposits on the catalyst may cover up or block catalytically active sites on the spent catalyst, thus, reducing the number of catalytically active sites available, which may reduce the catalytic activity of the catalyst. Following regeneration, the regenerated catalyst may have equal to or less than 10 wt. %, 5 wt. %, or even 1 wt. % coke based on the total weight of the regenerated catalyst. The combustion products may be removed from the regeneration process as a flue gas stream. The heated regenerated catalysts may then be recycled back to the cracking reaction zone of the FCC units.

Referring now to FIGS. 2 and 3, a hydrocarbon feed conversion system 100 is schematically depicted. The hydrocarbon feed conversion system 100 may be a high-severity fluid catalytic cracking (HSFCC) system. The hydrocarbon feed conversion system 100 generally receives a hydrocarbon feed stream 102 and directly processes the hydrocarbon feed stream 102 to produce one or more system product streams. The hydrocarbon feed conversion system 100 may include a feed separator 104, a first FCC reactor unit 120, a second FCC reactor unit 140, and a regenerator 160.

The hydrocarbon feed stream 102 may be introduced to the feed separator 104 which may separate the contents of the hydrocarbon feed stream 102 into at least a greater boiling point fraction stream 106, a medium boiling point fraction stream 107, and a lesser boiling point fraction stream 108. In one or more embodiments, at least 90 wt. %, at least 95 wt. %, at least 99 wt. %, or even at least 99.9 wt. % of the hydrocarbon feed stream may be present in the combination of the greater boiling point fraction stream 106, the medium boiling point fraction stream 107, and the lesser boiling point fraction stream 108. In one or more embodiments, the feed separator 104 may be a series of vapor-liquid separators such as a flash drums (sometimes referred to as a breakpot, knock-out drum, knock-out pot, compressor suction drum, or compressor inlet drum). The vapor-liquid separators may be operated at a temperature and pressure suitable to separate the hydrocarbon feed stream 102 into the greater boiling point fraction stream 106, the medium boiling point fraction stream 107, and the lesser boiling point fraction stream 108. It should be understood that a wide variety of fractionating separators may be utilized, such as distillation columns and the like.

In one or more embodiments, the lesser boiling point fraction stream 108 may have a final boiling point of from 140° C. to 175° C., such as from 150° C. to 165° C. In some embodiments, the lesser boiling point fraction stream 108 may include C5 chemicals as its lightest components. In some embodiments, the lightest components of the lesser boiling point fraction stream 108 may be those that are liquid at the environmental temperatures (such as the natural temperature at the plant site).

In one or more embodiments, the medium boiling point fraction stream 107 may have a final boiling point of from 300° C. to 450° C., such as from 350° C. to 400° C. The medium boiling point fraction stream 107 may have an initial boiling point of from 140° C. to 175° C., such as from 150° C. to 165° C.

In one or more embodiments, the greater boiling point fraction stream 106 may have an initial boiling point of from 300° C. to 450° C., such as from 350° C. to 400° C. The final boiling point of the greater boiling point fraction stream 106 may generally be dependent upon the heaviest components of the feed stream 102, and may be, for example, at least 500° C., or even at least 550° C.

In some embodiments, the final boiling point of the lesser boiling point fraction stream 108 may be equal to the initial boiling point of the medium boiling point fraction stream 107. In additional embodiments, the final boiling point of the medium boiling point fraction stream 107 may be equal to the initial boiling point of the greater boiling point fraction stream 106. In such embodiments, a "cut point" (at atmospheric pressure) may be said to exist between the respective fractions. In these embodiments, the cut point between the lesser boiling point fraction stream 108 and the medium boiling point fraction stream 107 may be from 140° C. to 175° C., such as from 150° C. to 165° C. The cut point between the medium boiling point fraction stream 107 and the greater boiling point fraction stream 106 may be from 300° C. to 450° C., such as from 350° C. to 400° C.

Table 2 shows example properties, according to one or more embodiments, for the greater boiling point fraction stream 106, the medium boiling point fraction stream 107, and the lesser boiling point fraction stream 108, where Arab light crude oil is used as the feedstock.

TABLE 2

| Property | Hydrocarbon feed stream | | |
| --- | --- | --- | --- |
| | Light boiling point fraction stream | Medium boiling point fraction stream | Greater boiling point fraction stream |
| IBP [° C.] | $C_5$ | 157 | 371 |
| FBP [° C.] | 157 | 371 | 566 |
| Yield [wt %] | 22 | 42 | 23 |
| Yield [vol %] | 25 | 43 | 21 |

TABLE 2-continued

| Property | Hydrocarbon feed stream | | |
| --- | --- | --- | --- |
| | Light boiling point fraction stream | Medium boiling point fraction stream | Greater boiling point fraction stream |
| Cumulative Volume [vol %] | 28 | 70 | 91 |

One or more supplemental feed streams (not shown) may be added to the hydrocarbon feed stream 102 prior to introducing the hydrocarbon feed stream 102 to the feed separator 104. As previously described, in one or more embodiments, the hydrocarbon feed stream 102 may be crude oil. In one or more embodiments, the hydrocarbon feed stream 102 may be crude oil, and one or more supplemental feed streams comprising one or more of a vacuum residue, tar sands, bitumen, atmospheric residue, vacuum gas oils, demetalized oils, naphtha streams, other hydrocarbon streams, or combinations of these materials, may be added to the crude oil upstream of the feed separator 104.

Although some embodiments of the present disclosure focus on converting a hydrocarbon feed stream 102 that is a crude oil, the hydrocarbon feed stream 102 may alternatively comprise a plurality of refinery hydrocarbon streams outputted from one or more crude oil refinery operations. The plurality of refinery hydrocarbon streams may include a vacuum residue, an atmospheric residue, or a vacuum gas oil, for example. In some embodiments, the plurality of refinery hydrocarbon streams may be combined into the hydrocarbon feed stream 102. In these embodiments, the hydrocarbon feed stream 102 may be introduced to the feed separator 104 and separated into the greater boiling point fraction stream 106, the medium boiling point fraction stream 107, and the lesser boiling point fraction stream 108. Alternatively, in some embodiments, the plurality of refinery hydrocarbon streams may be introduced directly to the first FCC reactor unit 120, the second FCC reactor unit 140, or both. For example, one or more heavy refinery hydrocarbon streams, such as vacuum residues, atmospheric residues, or vacuum gas oils, for example, may be introduced directly to the first FCC reactor unit 120 as the greater boiling point fraction stream 106, and other light refinery hydrocarbon streams, such as a naphtha stream for example, may be introduced directly to the second FCC reactor unit 140 as the lesser boiling point fraction stream 108 or the medium boiling point fraction stream 107.

Now referring to FIGS. 2 and 3, the greater boiling point fraction stream 106 may be passed to a first FCC reactor unit 120. The greater boiling point fraction stream 106 may be added to the first catalyst mixing zone 136. The greater boiling point fraction stream 106 may be combined or mixed with a first catalyst 124 and cracked to produce a mixture of a spent first catalyst 126 and a first cracking reaction product stream 128. The spent first catalyst 126 may be separated from the first cracking reaction product stream 128 and passed to a regeneration zone 162 of the regenerator 160.

The lesser boiling point fraction stream 108 and the medium boiling point fraction stream 107 may be passed to a second FCC reactor unit 140 that includes a second cracking reaction zone 142. As is described in detail in the present disclosure, the lesser boiling point fraction stream 108 may be injected into the second FCC reactor unit 140 at a position upstream of where the medium boiling point fraction stream 107 is injected into the second FCC reactor unit 140. The lesser boiling point fraction stream 108 may be mixed with a second catalyst 144 and cracked to produce a spent second catalyst 146 and a second cracking reaction product stream 148. The medium boiling point fraction stream 107 and lesser boiling point fraction stream 108 may be cracked to produce a spent second catalyst 146 and a second cracking reaction product stream 148. At least a portion of the lesser boiling point fraction stream 108 and the medium boiling point fraction stream 107 may be cracked to produce the second cracking reaction product stream 148. The spent second catalyst 146 may be separated from the second cracking reaction product stream 148 and passed to the regeneration zone 162 of the regenerator 160.

Steam (not shown) may be introduced to the hydrocarbon feed conversion system 100. Steam may be introduced to at least one of the lesser boiling point fraction stream 108, the medium boiling point fraction stream 107, and the greater boiling point fraction stream 106. Steam may act as a diluent to reduce a partial pressure of the hydrocarbons in at least one of the lesser boiling point fraction stream 108, the medium boiling point fraction stream 107, and the greater boiling point fraction stream 106. Steam may reduce secondary reactions and lead to a high yield of light olefins.

The spent first catalyst 126 and the spent second catalyst 146 may be combined and regenerated in the regeneration zone 162 of the regenerator 160 to produce a regenerated catalyst 116. The regenerated catalyst 116 may have a catalytic activity that is at least greater than the catalytic activity of the spent first catalyst 126 and the spent second catalyst 146. The regenerated catalyst 116 may then be passed back to the first cracking reaction zone 122 and the second cracking reaction zone 142. The first cracking reaction zone 122 and the second cracking reaction zone 142 may be operated in parallel.

It should be understood that, in some embodiments, the first catalyst 124 is different in composition than the second catalyst 144, the first catalyst 124 and the second catalyst 144 may be regenerated in separate regeneration units. That is, in some embodiments, two regeneration units may be utilized. In other embodiments, such as where the first catalyst 124 and the second catalyst 144 are the same in composition, the first catalyst 124 and second catalyst 144 may be regenerated in a common regeneration zone 162 as depicted in FIG. 3.

Referring back to FIGS. 2 and 3, in embodiments, the hydrocarbon feed conversion system 100 may include at least one catalyst recycle, such as spent first catalyst recycle. The first cracking reaction product stream 128 and the second cracking reaction product stream 148 each may include a mixture of cracked hydrocarbon materials, which may be further separated into one or more greater value petrochemical products and recovered from the system in the one or more system product streams. For example, the first cracking reaction product stream 128, the second cracking reaction product stream 148, or both may include the petrochemical products. The petrochemical products may be at least one of ethylene, propene, butene, or pentene. For example, the first cracking reaction product stream 128, the second cracking reaction product stream 148, or both may include one or more of cracked gas oil, cracked gasoline, cracked naphtha, mixed butenes, butadiene, propene, ethylene, other olefins, ethane, methane, other petrochemical products, or combinations of these. The cracked gasoline may be further processed to obtain aromatics such as benzene, toluene, zylenes, or other aromatics for example. The hydrocarbon feed conversion system 100 may include a product separator 112. The first cracking reaction product stream 128, the second cracking reaction product stream 148, or both the first and second cracking reaction product streams 128, 148, may be introduced to the product separator 112 to separate these streams into a plurality of system product streams. In some embodiments, the first cracking reaction product stream 128 and the second cracking reaction product stream 148 may be combined into a combined cracking reaction product stream 114. The combined cracking reaction product stream 114 may be introduced to the product separator 112. Referring to FIGS. 2 and 3, the product separator 112 may be fluidly coupled to the first separation zone 130, the second separation zone 150, or both the first separation zone 130 and the second separation zone 150. In embodiments, the first stripped product stream 134 and the second stripped product stream 154 may be combined to form mixed stripped product stream.

Referring to FIG. 2, the product separator 112 may be a distillation column or collection of separation devices that separates the first cracking reaction product stream 128, the second cracking reaction product stream 148, or the combined cracking reaction product stream 114 into one or more system product streams, which may include one or more of a fuel oil stream 181, a gasoline stream 182, a mixed butenes stream 183, a butadiene stream 184, a propene stream 185, an ethylene stream 186, a methane stream 187, light cycle oil streams (LCO, 216-343° C.) 188, heavy cycle oil streams (HCO, >343° C.) 189, other product streams, or combinations of these and a hydrogen stream 110. Each system product stream may be passed to one or more additional unit operations for further processing, or may be sold as raw goods. In embodiments, the first cracking reaction product stream 128 and the second cracking reaction product stream 148 may be separately introduced to the product separator 112. As used in this disclosure, the one or more system product streams may be referred to as petrochemical products, which may be used as intermediates in downstream chemical processing or packaged as finished products. The product separator 112 may also produce one or more cycle oil streams, which may be recycled to the hydrocarbon feed conversion system 100.

Referring now to FIG. 3, the first FCC reactor unit 120 may include a first catalyst mixing zone 136, the first cracking reaction zone 122, a first separation zone 130, and a first stripping zone 132. The greater boiling point fraction stream 106 may be introduced to the first catalyst mixing zone 136, where the greater boiling point fraction stream 106 may be mixed with the first catalyst 124. During steady state operation of the hydrocarbon feed conversion system 100, the first catalyst 124 may include at least the regenerated catalyst 116 that is passed to the first catalyst mixing zone 136 from a catalyst hopper 174. In embodiments, the first catalyst 124 may be a mixture of spent first catalyst 126 and regenerated catalyst 116. Alternatively, the first catalyst 124 may be a mixture of spent second catalyst 146 and regenerated catalyst 116. The catalyst hopper 174 may receive the regenerated catalyst 116 from the regenerator 160. At initial start-up of the hydrocarbon feed conversion system 100, the first catalyst 124 may include fresh catalyst (not shown), which is catalyst that has not been circulated through the first FCC reactor unit 120 or the second FCC reactor unit 140 and the regenerator 160. Because the fresh catalyst has not been circulated through a cracking reaction zone, the fresh catalyst may have a catalytic activity that is greater than the regenerated catalyst 116. In embodiments, fresh catalyst may also be introduced to the catalyst hopper 174 during operation of the hydrocarbon feed conversion system 100 so that a portion of the first catalyst 124 introduced to the first catalyst mixing zone 136 includes the fresh catalyst. Fresh catalyst may be introduced to the catalyst hopper 174 periodically during operation to replenish lost catalyst or compensate for spent catalyst that becomes deactivated, such as through heavy metal accumulation in the catalyst.

In some embodiments, one or more supplemental feed streams (not shown) may be combined with the greater boiling point fraction stream 106 before introduction of the greater boiling point fraction stream 106 to the first catalyst mixing zone 136. In other embodiments, one or more supplemental feed streams may be added directly to the first catalyst mixing zone 136, where the supplemental feed stream may be mixed with the greater boiling point fraction stream 106 and the first catalyst 124 prior to introduction into the first cracking reaction zone 122. As previously described, the supplemental feed stream may include one or more of vacuum residues, tar sands, bitumen, atmospheric residues, vacuum gas oils, demetalized oils, naphtha streams, other hydrocarbon streams, or combinations of these materials.

The mixture comprising the greater boiling point fraction stream 106 and the first catalyst 124 may be passed from the first catalyst mixing zone 136 to the first cracking reaction zone 122. The mixture of the greater boiling point fraction stream 106 and first catalyst 124 may be introduced to a top portion of the first cracking reaction zone 122. The first cracking reaction zone 122 may be a downflow reactor or "downer" reactor in which the reactants flow from the first catalyst mixing zone 136 vertically downward through the first cracking reaction zone 122 to the first separation zone 130. The greater boiling point fraction stream 106 may be reacted by contact with the first catalyst 124 in the first cracking reaction zone 122 to cause at least a portion of the greater boiling point fraction stream 106 to undergo at least a cracking reaction to form at least one cracking reaction product, which may include at least one of the petrochemical products previously described. The first catalyst 124 may have a temperature equal to or greater than the first cracking temperature $T_{122}$ of the first cracking reaction zone 122 and may transfer heat to the greater boiling point fraction stream 106 to promote the endothermic cracking reaction.

It should be understood that the first cracking reaction zone 122 of the first FCC reactor unit 120 depicted in FIG. 3 is a simplified schematic of one particular embodiment of the first cracking reaction zone 122 of an FCC unit, and other configurations of the first cracking reaction zone 122 may be suitable for incorporation into the hydrocarbon feed conversion system 100. For example, in some embodiments, the first cracking reaction zone 122 may be an up-flow cracking reaction zone. Other cracking reaction zone configurations are contemplated. The first FCC reactor unit may be a hydrocarbon feed conversion unit in which in the first cracking reaction zone 122, the fluidized first catalyst 124 contacts the greater boiling point fraction stream 106 under high-severity conditions. The first cracking temperature $T_{122}$ of the first cracking reaction zone 122 may be from 500° C. to 800° C., from 500° C. to 700° C., from 500° C. to 650° C., from 500° C. to 600° C., from 550° C. to 800° C., from 550° C. to 700° C., from 550° C. to 650° C., from 550° C. to 600° C., from 600° C. to 800° C., from 600° C. to 700° C., or from 600° C. to 650° C. In one or more embodiments, the first cracking temperature $T_{122}$ of the first cracking reaction zone 122 may be from 500° C. to 700° C. In one or more embodiments, the first cracking temperature $T_{122}$ of the first cracking reaction zone 122 may be from 550° C. to 630° C.

A weight ratio of the first catalyst 124 to the greater boiling point fraction stream 106 in the first cracking reaction zone 122 (the catalyst to hydrocarbon ratio) may be from 5:1 to 40:1, from 5:1 to 35:1, from 5:1 to 30:1, from 5:1 to 25:1, from 5:1 to 15:1, from 5:1 to 10:1, from 10:1 to 40:1, from 10:1 to 35:1, from 10:1 to 30:1, from 10:1 to 25:1, from 10:1 to 15:1, from 15:1 to 40:1, from 15:1 to 35:1, from 15:1 to 30:1, from 15:1 to 25:1, from 25:1 to 40:1, from 25:1 to 35:1, from 25:1 to 30:1, or from 30:1 to 40:1. The residence time of the mixture of first catalyst 124 and the greater boiling point fraction stream 106 in the first cracking reaction zone 122 may be from 0.2 seconds (sec) to 3 sec, from 0.2 sec to 2.5 sec, from 0.2 sec to 2 sec, from 0.2 sec to 1.5 sec, from 0.4 sec to 3 sec, from 0.4 sec to 2.5 sec, or from 0.4 sec to 2 sec, from 0.4 sec to 1.5 sec, from 1.5 sec to 3 sec, from 1.5 sec to 2.5 sec, from 1.5 sec to 2 sec, or from 2 sec to 3 sec.

Following the cracking reaction in the first cracking reaction zone 122, the contents of the effluent from the first cracking reaction zone 122 may include the first catalyst 124 and the first cracking reaction product stream 128, which may then be passed to the first separation zone 130. In the first separation zone 130, the first catalyst 124 may be separated from at least a portion of the first cracking reaction product stream 128. In some embodiments, the first separation zone 130 may include one or more gas-solid separators, such as one or more cyclones. The first catalyst 124 exiting from the first separation zone 130 may retain at least a residual portion of the first cracking reaction product stream 128.

After the first separation zone 130, the first catalyst 124, which may include the residual portion of the first cracking reaction product stream 128 retained in the first catalyst 124, may be passed to a first stripping zone 132, where at least some of the residual portion of the first cracking reaction product stream 128 may be stripped from the first catalyst 124 and recovered as a first stripped product stream 134. The first stripped product stream 134 may be passed to one or more than one downstream unit operations or combined with one or more than one other streams for further processing. Steam 133 may be introduced to the first stripping zone 132 to facilitate stripping the first cracking reaction product stream 128 from the first catalyst 124. The first stripped product stream 134 may include at least a portion of the steam 133 introduced to the first stripping zone 132. The first stripped product stream 134 may be discharged from the first stripping zone 132 may be passed through cyclone separators (not shown) and out of the stripper vessel (not shown). The first stripped product stream 134 may be directed to one or more product recovery systems in accordance with known methods in the art, or may be recycled by combining with steam. The first stripped product stream 134 may also be combined with one or more other streams, such as the first cracking reaction product stream 128, for example. The first stripped product stream 134 may also be combined with the second stripped product stream 154. The spent first catalyst 126, which is the first catalyst 124 after stripping out the first stripped product stream 134, may be passed from the first stripping zone 132 to the regeneration zone 162 of the regenerator 160 to be regenerated to produce regenerated catalyst 116.

Referring still to FIG. 3, the lesser boiling point fraction stream 108 and the medium boiling point fraction stream 107 may be passed from the feed separator 104 to the second FCC reactor unit 140 (as shown in FIG. 2). The second FCC reactor unit 140 may include a second catalyst mixing zone 156, the second cracking reaction zone 142, a second separation zone 150, and a second stripping zone 152. The catalyst mixing zone may fluidize the catalyst, and may mix the catalyst with process streams such as inert carrier streams or the lesser boiling point fraction stream 108 and/or medium boiling point fraction stream 107 if they are injected into the second catalyst mixing zone.

As is described herein, the lesser boiling point fraction stream 108 may be passed to the second FCC reactor unit 140 upstream of where the medium boiling point fraction stream 107 is passed to the second FCC reactor unit 140. Without limitation, several embodiments are contemplated for achieving such an arrangement. For example, as is depicted in FIG. 3, the lesser boiling point fraction stream 108 and medium boiling point fraction stream 107 may both be injected into the second cracking reaction zone 142, where the lesser boiling point fraction stream 108 is injected upstream of the medium boiling point fraction stream 107. In another embodiment, the lesser boiling point fraction stream 108 may be injected into the second catalyst mixing zone 156 and the medium boiling point fraction stream 107 may be injected into the second cracking reaction zone 142. In another embodiment, the lesser boiling point fraction stream 108 and the medium boiling point fraction stream 107 may be injected into the second catalyst mixing zone 156, where the lesser boiling point fraction stream 108 is injected upstream of the medium boiling point fraction stream 107. While the following disclosure will detail the embodiment depicted in FIG. 3 with respect to the injection of the lesser boiling point fraction stream 108 and the medium boiling point fraction stream 107 (i.e., into the second cracking reaction zone 142), the other embodiments should be considered within the presently disclosed embodiments.

Still referring to FIG. 3, during steady state operation of the hydrocarbon feed conversion system 100, the second catalyst 144 may include at least the regenerated catalyst 116 that is passed to the second catalyst mixing zone 156 from a catalyst hopper 174. In embodiments, the second catalyst 144 may be a mixture of spent second catalyst 146 and regenerated catalyst 116. Alternatively, the second catalyst 144 may be a mixture of spent first catalyst 126 and regenerated catalyst 116. The catalyst hopper 174 may receive the regenerated catalyst 116 from the regenerator 160 following regeneration of the spent first catalyst 126 and spent second catalyst 146. At initial start-up of the hydrocarbon feed conversion system 100, the second catalyst 144 may include fresh catalyst (not shown), which is catalyst that has not been circulated through the first FCC reactor unit 120 or the second FCC reactor unit 140 and the regenerator 160. In embodiments, fresh catalyst may also be introduced to catalyst hopper 174 during operation of the hydrocarbon feed conversion system 100 so that at least a portion of the second catalyst 144 introduced to the second catalyst mixing zone 156 includes the fresh catalyst. Fresh catalyst may be introduced to the catalyst hopper 174 periodically during operation to replenish lost catalyst or compensate for spent catalyst that becomes permanently deactivated, such as through heavy metal accumulation in the catalyst.

The second catalyst 144 may be passed from the second catalyst mixing zone 156 to the second cracking reaction zone 142. The second cracking reaction zone 142 may be a downflow reactor or "downer" reactor in which the reactants flow from the second catalyst mixing zone 156 downward through the second cracking reaction zone 142 to the second separation zone 150. The second catalyst 144 may have a temperature equal to or greater than the second cracking average temperature $T_{142}$ of the second cracking reaction zone 142 and may transfer heat to the lesser boiling point fraction stream 108 and the medium boiling point fraction stream 107 to promote the endothermic cracking reaction.

According to one or more embodiments, the lesser boiling point fraction stream 108 and the medium boiling point fraction stream 107 are passed to the second cracking reaction zone 142 of the second FCC reactor unit 140. The lesser boiling point fraction stream 108 and medium boiling point fraction stream 107 may be passed into different injection points (e.g., at different heights) on the second cracking reaction zone 142. For example, the lesser boiling point fraction stream 108 may be injected at or near the top of the second cracking reaction zone 142, while lesser boiling point fraction stream 108 may be injected into a downstream portion (e.g., near the midsection) of the second cracking reaction zone 142.

In one or more embodiments, the lesser boiling point fraction stream 108 may initially be exposed to greater temperatures than the medium boiling point fraction stream 107 in the second FCC reactor unit 140. In some embodiments, the far majority of the heat in the second FCC reactor unit 140 is contributed from the second catalyst 144. In one or more embodiments, when the second catalyst 144 is intermixed with the lesser boiling point fraction stream 108 and/or the medium boiling point fraction stream 107 (which are at lower temperatures) the temperature in the second FCC reactor unit 140 is reduced. Residual heat losses as the second catalyst 144 moves through the second FCC reactor unit 140 may also be present. By injecting the lesser boiling point fraction stream 108 upstream of the medium boiling point fraction stream 107, the lesser boiling point fraction stream 108 may experience greater temperatures when initially injected into the second FCC reactor unit 140 than those experienced by the medium boiling point fraction stream 107. For example, temperatures in the second FCC reactor unit 140 (for example, in the second catalyst mixing zone 156) at the point of injection of the lesser boiling point fraction stream 108 may be at least 5° C., at least 10° C., at least 15°, or even at least 20° C. greater than at the point of injection of the medium boiling point fraction stream 107. For example, the temperature at the injection point of the lesser boiling point fraction stream 108 may be about 660° C., whereas the temperature at the injection point of the medium boiling point fraction stream 107 may be about 640° C.

Without being bound by theory, it is believed that the higher temperatures experienced by the lesser boiling point fraction stream 108 may improve overall system performance since greater temperatures may result in greater catalytic reactivity, and the contents of the lesser boiling point fraction stream 108 may be relatively more difficult to react (i.e., have lower reactivity at similar conditions) than the contents of the medium boiling point fraction stream 107. The lower reactivity rate may generally be due to the smaller molecular size of the contents of the lesser boiling point fraction stream 108 as compared with the contents of the medium boiling point fraction stream 107.

In one or more embodiments, the lesser boiling point fraction stream 108 may initially have a greater catalyst:oil ratio than the medium boiling point fraction stream 107 in the second FCC reactor unit 140. As described herein, the catalyst:oil ratio is the weight ratio of catalyst to the amount of oil from the lesser boiling point fraction stream 108 and/or medium boiling point fraction stream 107 at a particular point in the second FCC reactor unit 140. The catalyst:oil ratio initially experienced by the lesser boiling point fraction stream 108 and medium boiling point fraction stream 107 may be affected by the relative positions of injection of the lesser boiling point fraction stream 108 and medium boiling point fraction stream 107. For example, when the lesser boiling point fraction stream 108 is injected upstream of the medium boiling point fraction stream 107, the lesser boiling point fraction stream 108 experiences a greater catalyst:oil ratio than the medium boiling point fraction stream 107. This may be due to about the same amount of catalyst being present in all portions of the second FCC reactor unit 140, while the lesser boiling point fraction stream 108 initially only has the amount of oil associated with the lesser boiling point fraction stream 108 at its injection point. On the other hand, the medium boiling point fraction stream 107 experiences the same amount of catalyst, but is mixed with the lesser boiling point fraction stream 108 that was injected upstream.

Without being bound by theory, it is believed that the greater catalyst:oil ratios experienced by the lesser boiling point fraction stream 108 may improve overall system performance since greater catalyst; oil may result in greater catalytic reactivity, and the contents of the lesser boiling point fraction stream 108 may be relatively more difficult to react (i.e., have lower reactivity at similar conditions) than the contents of the medium boiling point fraction stream 107. The lower reactivity rate may generally be due to the smaller molecular size of the contents of the lesser boiling point fraction stream 108 as compared with the contents of the medium boiling point fraction stream 107.

In one or more embodiments, the lesser boiling point fraction stream 108 may have a greater residence time than the medium boiling point fraction stream 107 in the second FCC reactor unit 140. The residence time experienced by the lesser boiling point fraction stream 108 and medium boiling point fraction stream 107 may be affected by the relative positions of injection of the lesser boiling point fraction stream 108 and medium boiling point fraction stream 107. For example, when the lesser boiling point fraction stream 108 is injected upstream of the medium boiling point fraction stream 107, the lesser boiling point fraction stream 108 experiences a greater residence time than the medium boiling point fraction stream 107. This is generally due to the increased time in which the lesser boiling point fraction stream 108 is in contact with the second catalyst 144 as compared to that of the medium boiling point fraction stream 107.

Without being bound by theory, it is believed that the greater residence time experienced by the lesser boiling point fraction stream 108 may improve overall system performance since greater residence time may result in greater catalytic reactivity, and the contents of the lesser boiling point fraction stream 108 may be relatively more difficult to react (i.e., have lower reactivity at similar conditions) than the contents of the medium boiling point fraction stream 107. The lower reactivity rate may generally be due to the smaller molecular size of the contents of the lesser boiling point fraction stream 108 as compared with the contents of the medium boiling point fraction stream 107.

In some embodiments, one or more supplemental feed streams (not shown) may be combined with the lesser boiling point fraction stream 108, the medium boiling point fraction stream 107, or both before introduction of these to the second FCC reactor unit 140. In other embodiments, one or more supplemental feed streams may be added directly to the second FCC reactor unit 140. The supplemental feed stream may include one or more naphtha streams or other lesser boiling hydrocarbon streams.

It should be understood that the second cracking reaction zone 142 of the second FCC reactor unit 140 depicted in FIG. 3 is a simplified schematic of one particular embodiment of the second cracking reaction zone 142, and other configurations of the second cracking reaction zone 142 may be suitable for incorporation into the hydrocarbon feed conversion system 100. For example, in some embodiments, the second cracking reaction zone 142 may be an up-flow cracking reaction zone. Other cracking reaction zone configurations are contemplated. The second FCC reactor unit 140 may be a hydrocarbon feed conversion unit in which in the second cracking reaction zone 142, the fluidized second catalyst 144 contacts the lesser boiling point fraction stream 108 at high-severity conditions. The second cracking temperature $T_{142}$ of the second cracking reaction zone 142 may be from 500° C. to 800° C., from 500° C. to 700° C., from 500° C. to 650° C., from 500° C. to 600° C., from 550° C. to 800° C., from 550° C. to 700° C., from 550° C. to 650° C., from 550° C. to 600° C., from 600° C. to 800° C., from 600° C. to 700° C., or from 600° C. to 650° C. In some embodiments, the second cracking temperature $T_{142}$ of the second cracking reaction zone 142 may be from 500° C. to 700° C. In other embodiments, the second cracking temperature $T_{142}$ of the second cracking reaction zone 142 may be from 550° C. to 630° C. In some embodiments, the second cracking temperature $T_{142}$ may be different than the first cracking temperature $T_{122}$.

A weight ratio of the second catalyst 144 to the lesser boiling point fraction stream 108 and the medium boiling point fraction stream 107 in the second cracking reaction zone 142 (catalyst to hydrocarbon ratio) may be from 5:1 to 40:1, from 5:1 to 35:1, from 5:1 to 30:1, from 5:1 to 25:1, from 5:1 to 15:1, from 5:1 to 10:1, from 10:1 to 40:1, from 10:1 to 35:1, from 10:1 to 30:1, from 10:1 to 25:1, from 10:1 to 15:1, from 15:1 to 40:1, from 15:1 to 35:1, from 15:1 to 30:1, from 15:1 to 25:1, from 25:1 to 40:1, from 25:1 to 35:1, from 25:1 to 30:1, or from 30:1 to 40:1. In some embodiments, the weight ratio of the second catalyst 144 to the lesser boiling point fraction stream 108 and the medium boiling point fraction stream 107 in the second cracking reaction zone 142 may be different than the weight ratio of the first catalyst 124 to the greater boiling point fraction stream 106 in the first cracking reaction zone 122. The residence time of the mixture of second catalyst 144 and the lesser boiling point fraction stream 108 and the medium boiling point fraction stream 107 in the second cracking reaction zone 142 may be from 0.2 seconds (sec) to 3 sec, from 0.2 sec to 2.5 sec, from 0.2 sec to 2 sec, from 0.2 sec to 1.5 sec, from 0.4 sec to 3 sec, from 0.4 sec to 2.5 sec, or from 0.4 sec to 2 sec, from 0.4 sec to 1.5 sec, from 1.5 sec to 3 sec, from 1.5 sec to 2.5 sec, from 1.5 sec to 2 sec, or from 2 sec to 3 sec. In some embodiments, the residence time in the second cracking reaction zone 142 may be different than the residence time in the first cracking reaction zone 122.

Following the cracking reaction in the second cracking reaction zone 142, the contents of effluent from the second cracking reaction zone 142 may include the second catalyst 144 and the second cracking reaction product stream 148, which may be passed to the second separation zone 150. In the second separation zone 150, the second catalyst 144 may be separated from at least a portion of the second cracking reaction product stream 148. In embodiments, the second separation zone 150 may include one or more gas-solid separators, such as one or more cyclones. The second catalyst 144 exiting from the second separation zone 150 may retain at least a residual portion of the second cracking reaction product stream 148.

After the second separation zone 150, the second catalyst 144 may be passed to the second stripping zone 152, where at least some of the residual portion of the second cracking reaction product stream 148 may be stripped from the second catalyst 144 and recovered as a second stripped product stream 154. The second stripped product stream 154 may be passed to one or more than one downstream unit operations or combined with one or more than one other streams for further processing. Steam may be introduced to the second stripping zone 152 to facilitate stripping the second cracking reaction product stream 148 from the second catalyst 144. The second stripped product stream 154 may include at least a portion of the steam introduced to the second stripping zone 152 and may be passed out of the second stripping zone 152. The second stripped product stream 154 may pass through cyclone separators (not shown) and out of the stripper vessel (not shown). The second stripped product stream 154 may be combined with the first stripped product stream 134. Combination with other streams is contemplated. For example, the first stripped product stream 134, which may comprise a majority steam, may be combined with steam. In another embodiment, the first stripped product stream 134 may be separated into steam and hydrocarbons, and the steam portion may be combined with steam. The spent second catalyst 146, which is the second catalyst 144 after stripping out the second stripped product stream 154, may be passed from the second stripping zone 152 to the regeneration zone 162 of the regenerator 160.

Referring to FIG. 3, the same type of catalyst may be used throughout the hydrocarbon feed conversion system 100, such as for the first catalyst 124 and the second catalyst 144. The catalyst (first catalyst 124 and second catalyst 144) used in the hydrocarbon feed conversion system 100 may include one or more fluid catalytic cracking catalysts that are suitable for use in the first cracking reaction zone 122 and the second cracking reaction zone 142. The catalyst may be a heat carrier and may provide heat transfer to the greater boiling point fraction stream 106 in the first cracking reaction zone 122 operated at high-severity conditions and the lesser boiling point fraction stream 108 and the medium boiling point fraction stream 107 in the second cracking reaction zone 142 operated at high-severity conditions. The catalyst may also have a plurality of catalytically active sites, such as acidic sites for example, that promote the cracking reaction. For example, in embodiments, the catalyst may be a high-activity FCC catalyst having high catalytic activity. Examples of fluid catalytic cracking catalysts suitable for use in the hydrocarbon feed conversion system 100 may include, without limitation, zeolites, silica-alumina catalysts, carbon monoxide burning promoter additives, bottoms cracking additives, light olefin-producing additives, other catalyst additives, or combinations of these components. Zeolites that may be used as at least a portion of the catalyst for cracking may include, but are not limited to Y, REY, USY, RE-USY zeolites, or combinations of these. The catalyst may also include a shaped selective catalyst additive, such as ZSM-5 zeolite crystals or other pentasil-type catalyst structures, which are often used in other FCC processes to produce light olefins and/or increase FCC gasoline octane. In one or more embodiments, the catalyst may include a mixture of ZSM-5 zeolite crystals and the cracking catalyst zeolite and matrix structure of a typical FCC cracking catalyst. In one or more embodiments, the catalyst may be a mixture of Y and ZSM-5 zeolite catalysts embedded with clay, alumina, and binder.

In one or more embodiments, at least a portion of the catalyst may be modified to include one or more rare earth elements (15 elements of the Lanthanide series of the IUPAC Periodic Table plus scandium and yttrium), alkaline earth metals (Group 2 of the IUPAC Periodic Table), transition metals, phosphorus, fluorine, or any combination of these, which may enhance olefin yield in the first cracking reaction zone 122, second cracking reaction zone 142, or both. Transition metals may include "an element whose atom has a partially filled d sub-shell, or which can give rise to cations with an incomplete d sub-shell" [IUPAC, Compendium of Chemical Terminology, 2nd ed. (the "Gold Book") (1997). Online corrected version: (2006—) "transition element"]. One or more transition metals or metal oxides may also be impregnated onto the catalyst. Metals or metal oxides may include one or more metals from Groups 6-10 of the IUPAC Periodic Table. In some embodiments, the metals or metal oxides may include one or more of molybdenum, rhenium, tungsten, or any combination of these. In one or more embodiments, a portion of the catalyst may be impregnated with tungsten oxide.

Referring to FIG. 3, the first FCC reactor unit 120 and the second FCC reactor unit 140 may share the regenerator 160. The spent first catalyst 126 and the spent second catalyst 146 may be passed to the regenerator 160, where the spent first catalyst 126 and the spent second catalyst 146 are mixed together and regenerated to produce the regenerated catalyst 116. The regenerator 160 may include the regeneration zone 162, a catalyst transfer line 164, the catalyst hopper 174, and a flue gas vent 166. The catalyst transfer line 164 may be fluidly coupled to the regeneration zone 162 and the catalyst hopper 174 for passing the regenerated catalyst 116 from the regeneration zone 162 to the catalyst hopper 174. In some embodiments, the regenerator 160 may have more than one catalyst hopper 174, such as a first catalyst hopper (not shown) for the first FCC reactor unit 120 and a second catalyst hopper (not shown) for the second FCC reactor unit 140, for example. In some embodiments, the flue gas vent 166 may be positioned at the catalyst hopper 174.

In operation, the spent first catalyst 126 and spent second catalyst 146 may be passed from the first stripping zone 132 and the second stripping zone 152, respectively, to the regeneration zone 162. Combustion gas 170 may be introduced to the regeneration zone 162. The combustion gases 170 may include one or more of combustion air, oxygen, fuel gas, fuel oil, other component, or any combinations of these. In the regeneration zone 162, the coke deposited on the spent first catalyst 126 and the spent second catalyst 146 may at least partially oxidize (combusts) in the presence of the combustion gases 170 to form at least carbon dioxide and water. In some embodiments, the coke deposits on the spent first catalyst 126 and spent second catalyst 146 may be fully oxidized in the regeneration zone 162. Other organic compounds, such as residual first cracking reaction product or second cracking reaction product for example, may also oxidize in the presence of the combustion gases 170 in the regeneration zone. Other gases, such as carbon monoxide for example, may be formed during coke oxidation in the regeneration zone 162. Oxidation of the coke deposits produces heat, which may be transferred to and retained by the regenerated catalyst 116.

The single catalyst regenerator 160 for regenerating the spent first catalyst 126 and the spent second catalyst 146 may improve the overall efficiency of the hydrocarbon feed conversion system 100. For example, cracking of the lesser boiling point fraction stream 108 and and the medium boiling point fraction stream 107 in the second FCC reactor unit 140 may produce less coke deposits on the spent second catalyst 146 compared to cracking of the greater boiling point fraction stream 106 in the first FCC reactor unit 120. Combustion of the coke deposits on the spent second catalyst 146 during regeneration produces heat, but the amount of coke present on the spent second catalyst 146 may not be sufficient to produce enough heat to conduct the cracking reactions in the second cracking reaction zone 142. Thus, regeneration of the spent second catalyst 146 by itself may not produce enough heat to raise the temperature of the regenerated catalyst 116 to an acceptable second cracking temperature $T_{142}$ in the second cracking reaction zone 142. By comparison, the amount of coke formed and deposited on the spent first catalyst 126 during cracking of the greater boiling point fraction stream 106 in the first FCC reactor unit 120 may be substantially greater than the coke deposits produced in the second cracking reaction zone 142. Combustion of the coke deposits on the spent first catalyst 126 during catalyst regeneration may produce sufficient heat to raise the temperature of the regenerated catalyst 116 (including the regenerated catalyst 116 produced from both the spent first catalyst 126 and the spent second catalyst 146) to high-severity conditions, such as a regenerated catalyst temperature $T_{116}$ equal to or greater than the first cracking temperature $T_{122}$ or the second cracking temperature $T_{142}$ for example, and may provide the heat required to conduct the cracking reactions in both the first cracking reaction zone 122 and the second cracking reaction zone 142.

The flue gases 172 may convey the regenerated catalyst 116 through the catalyst transfer line 164 from the regeneration zone 162 to the catalyst hopper 174. The regenerated catalyst 116 may accumulate in the catalyst hopper 174 prior to passing from the catalyst hopper 174 to the first FCC reactor unit 120 and the second FCC reactor unit 140. The catalyst hopper 174 may act as a gas-solid separator to separate the flue gas 172 from the regenerated catalyst 116. In embodiments, the flue gas 172 may pass out of the catalyst hopper 174 through a flue gas vent 166 disposed in the catalyst hopper 174.

The catalyst may be circulated through the first FCC reactor unit 120, the second FCC reactor unit 140, the regenerator 160, and the catalyst hopper 174. For example, the first catalyst 124 may be introduced to the first FCC reactor unit 120 to catalytically crack the greater boiling point fraction stream 106 in the first FCC reactor unit 120. During cracking, coke deposits may form on the first catalyst 124 to produce the spent first catalyst 126 passing out of the first stripping zone 132. The spent first catalyst 126 may have catalytic activity that is less than the regenerated catalyst 116, meaning that the spent first catalyst 126 may be less effective at enabling cracking reactions compared to the regenerated catalyst 116. The spent first catalyst 126 may be separated from the first cracking reaction product stream 128 in the first separation zone 130 and the first stripping zone 132. The second catalyst 144 may be introduced to the second FCC reactor unit 140 to catalytically crack the lesser boiling point fraction stream 108 and the medium boiling point fraction stream 107 in the second FCC reactor unit 140. During cracking, coke deposits may form on the second catalyst 144 to produce the spent second catalyst 146 passing out of the second stripping zone 152. The spent second catalyst 146 also may have a catalytic activity that is less than the catalytic activity of the regenerated catalyst 116, meaning that the spent second catalyst 146 may be less effective at enabling the cracking reactions compared to the regenerated catalyst 116. The spent second catalyst 146 may be separated from the second cracking reaction product stream 148 in the second separation zone 150 and the second stripping zone 152. The spent first catalyst 126 and spent second catalyst 146 may then be combined and regenerated in the regeneration zone 162 to produce the regenerated catalyst 116. The regenerated catalyst 116 may be transferred to the catalyst hopper 174.

The regenerated catalyst 116 passing out of the regeneration zone 162 may have less than 1 wt. % coke deposits, based on the total weight of the regenerated catalyst 116. In some embodiments, the regenerated catalyst 116 passing out of the regeneration zone 162 may have less than 0.5 wt. %, less than 0.1 wt. %, or less than 0.05 wt. % coke deposits. In some embodiments, the regenerated catalyst 116 passing out of the regeneration zone 162 to the catalyst hopper 174 may have from 0.001 wt. % to 1 wt. %, from 0.001 wt. % to 0.5 wt. %, from 0.001 wt. % to 0.1 wt. %, from 0.001 wt. % to 0.05 wt. %, from 0.005 wt. % to 1 wt. %, from 0.005 wt. % to 0.5 wt. %, from 0.005 wt. % to 0.1 wt. %, from 0.005 wt. % to 0.05 wt. %, from 0.01 wt. % to 1 wt. %, from 0.01 wt. % to 0.5 wt. % to 0.01 wt. % to 0.1 wt. %, from 0.01 wt. % to 0.05 wt. % coke deposits, based on the total weight of the regenerated catalyst 116. In one or more embodiments, the regenerated catalyst 116 passing out of regeneration zone 162 may be substantially free of coke deposits. As used in this disclosure, the term "substantially free" of a component means less than 1 wt. % of that component in a particular portion of a catalyst, stream, or reaction zone. As an example, the regenerated catalyst 116 that is substantially free of coke deposits may have less than 1 wt. % of coke deposits. Removal of the coke deposits from the regenerated catalyst 116 in the regeneration zone 162 may remove the coke deposits from the catalytically active sites, such as acidic sites for example, of the catalyst that promote the cracking reaction. Removal of the coke deposits from the catalytically active sites on the catalyst may increase the catalytic activity of the regenerated catalyst 116 compared to the spent first catalyst 126 and the spent second catalyst 146. Thus, the regenerated catalyst 116 may have a catalytic activity that is greater than the spent first catalyst 126 and the spent second catalyst 146.

The regenerated catalyst 116 may absorb at least a portion of the heat generated from combustion of the coke deposits. The heat may increase the temperature of the regenerated catalyst 116 compared to the temperature of the spent first catalyst 126 and spent second catalyst 146. The regenerated catalyst 116 may accumulate in the catalyst hopper 174 until it is passed back to the first FCC reactor unit 120 as at least a portion of the first catalyst 124 and the second FCC reactor unit 140 as at least a portion of the second catalyst 144. The regenerated catalyst 116 in the catalyst hopper 174 may have a temperature that is equal to or greater than the first cracking temperature $T_{122}$ in the first cracking reaction zone 122 of the first FCC reactor unit 120, the second cracking temperature $T_{142}$ in the second cracking reaction zone 142 of the second FCC reactor unit 140, or both. The greater temperature of the regenerated catalyst 116 may provide heat for the endothermic cracking reaction in the first cracking reaction zone 122, the second cracking reaction zone 142, or both.

As previously discussed, the hydrocarbon feed stream 102, such as crude oil for example, can have a wide range of compositions and a wide range of boiling points. The hydrocarbon feed stream 102 may be separated into the greater boiling point fraction stream 106, the medium boiling point fraction stream 107, and the lesser boiling point fraction stream 108. Because of the difference of compositions, each of the greater boiling point fraction stream 106, the medium boiling point fraction stream 107, and the lesser boiling point fraction stream 108 may benefit from different operating temperatures and catalyst activities to produce desired yields of one or more petrochemical products or increase the selectivity of the reaction for certain products. For example, the greater boiling point fraction stream 106 may be more reactive and, thus, may require less cracking activity than the medium boiling point fraction stream 107 and the lesser boiling point fraction stream 108 to produce sufficient yields of or selectivity for a specific petrochemical product. The lesser cracking activity suitable for the greater boiling point fraction stream 106 may be provided by reducing the catalytic activity of the first catalyst 124 in the first cracking reaction zone 122, reducing the first cracking temperature $T_{122}$ in the first cracking reaction zone 122, or a combination of both. In contrast, the lesser boiling point fraction stream 108 and the medium boiling point fraction stream 107 may be less reactive and may require greater catalytic activity, such as an increased catalytic activity of the second catalyst 144 in the second cracking reaction zone 142, a second cracking temperature $T_{142}$ in the second cracking reaction zone 142 greater than the first cracking temperature $T_{122}$, or both, compared to the greater boiling point fraction stream 106 to produce sufficient yields of or selectivity for the specific petrochemical products.

As previously described in this disclosure, the hydrocarbon feed conversion system 100 may include a single regenerator 160 to regenerate the spent first catalyst 126 and the spent second catalyst 146 to produce the regenerated catalyst 116. Therefore, the regenerated catalyst 116 passed to the first FCC reactor unit 120 is the same as and has the same catalytic effectiveness and temperature as the regenerated catalyst 116 passed to the second FCC reactor unit 140. However, as previously discussed, the reaction conditions in the first FCC reactor unit 120 or second FCC reactor unit 140 for producing sufficient yields of or selectivity for specific petrochemical products may be different than the reaction conditions provided by passing the regenerated catalyst 116 to either the first FCC reactor unit 120 or the second FCC reactor unit 140.

EXAMPLES

The various embodiments of methods and systems for the conversion of feedstock fuels will be further clarified by the following examples. The examples are illustrative in nature, and should not be understood to limit the subject matter of the present disclosure.

Example A

Example A shows a comparison between cracking combined lesser and medium boiling point fractions (case 1) versus separated lesser and medium boiling point fractions (case 2). The crude oil feed stream was Saudi Arabian Extra Light (AXL) Crude Oil provided by Saudi Aramco. In case 1, the lesser and medium boiling point fractions were cracked at a temperature of 640° C. and a weight ratio of catalyst to oil of 29:1. The cracking catalyst was composed of Y base zeolite catalyst and ZSM-5 based additive. In case 2, the lesser boiling point fraction was cracked at a temperature of 660° C. and a weight ratio of catalyst to oil of 29:1. The cracking catalyst was also composed of Y base zeolite catalyst and ZSM-5 based additive. The medium boiling point fraction was cracked at a temperature of 640° C. and a weight ratio of catalyst to oil of 29:1. The cracking catalyst was also composed of Y base zeolite catalyst and ZSM-5 based additive.

The reaction product streams from the cracking reaction were analyzed for yields of dry gas (H2, C1 & C2), light olefins (ethylene, propylene, and butylene), gasoline and coke. The reaction conditions and yield analysis for Example A are subsequently provided in Table 4.

TABLE 4

| Injections to the Light Fractions Downer | Case 1 Lesser BP and Medium BP Fraction | Case 2 | |
|---|---|---|---|
| | | Lesser BP Fraction | Medium BP Fraction |
| Feed Boling Range [° C.] | $C_5$-371 | $C_5$-157 | 157-371 |
| Reaction Temperature [° C.] | 640 | 660 | 640 |
| Conversion [wt % injection] | 50.8 | 44.9 | 56.0 |
| Dist. Yield [wt % whole crude] | 64.4 | 22 | 42.4 |
| Group Yield [wt % injection] | | | |
| Dry Gases ($H_2 + C_1 + C_2$) | 4.4 | 5.20 | 4.4 |
| Coke | 2.2 | 1.57 | 2.3 |
| LPG Paraffins ($C_3 + C_4$) | 8.2 | 3.70 | 8.2 |
| Gasoline ($C_5$) | 53.7 | 65.20 | 47.2 |
| Light Olefins ($C_2= + C_3= + C_4=$) | 31.1 | 24.01 | 37.3 |
| Other Gases | 0.1 | 0.14 | 0.1 |

As shown in Table 4, Case 2 led to more efficient cracking than Case 1. Case 2 resulted in more light olefins (24 wt. % of light olefins from the lesser boiling point fraction, and 37.3 wt. % of light olefins from the medium boiling point fraction) considering the weight and volume fraction of the lesser and medium boiling point fractions. In particular, higher yields of ethylene and propylene were achieved in Case 2. When accounting for weight percents, the lesser fraction to medium fraction in the separated feed, 32.9 wt. % of light olefins were achieved (as compared with 31.1 wt. % in case 1). Moreover, it is contemplated that operating at higher catalyst:oil ratio and residence time may improve the yields from the lesser boiling point fraction.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

In a first aspect of the present disclosure, petrochemical products may be produced from a hydrocarbon material by a process that may comprise: separating the hydrocarbon material into at least a lesser boiling point fraction, a medium boiling point fraction, and a greater boiling point fraction; cracking at least a portion of the greater boiling point fraction in the presence of a first catalyst in a first reactor unit at a reaction temperature of from 500° C. to 700° C. to produce a first cracking reaction product; and cracking at least a portion of the lesser boiling point fraction and the medium boiling point fraction in a second reactor unit in the presence of a second catalyst at a reaction temperature of from 500° C. to 700° C. to produce a second cracking reaction product. The lesser boiling point fraction enters the second reactor unit upstream of wherein the medium boiling point fraction enters the second reactor. The method may further comprise separating the petrochemical products from one or both of the first cracking reaction product or the second cracking reaction product.

A second aspect of the present disclosure may include the first aspect where the lesser boiling point fraction may be initially exposed to greater temperatures in the second reactor unit, initially may have a greater catalyst:oil ratio in the second reactor unit, may have a greater residence time in the second reactor unit, or combinations thereof, as compared to the medium boiling point fraction.

A third aspect of the present disclosure may include either of the first or second aspects wherein the hydrocarbon material may be crude oil.

A fourth aspect of the present disclosure may include any of the first through third aspects where the method may further comprise mixing the greater boiling point fraction with the first catalyst to crack at least a portion of the greater boiling point fraction; and separating the first catalyst from at least a portion of the first cracking reaction product.

A fifth aspect of the present disclosure may include any of the first through fourth aspects where the method may further comprise mixing the lesser boiling point fraction with the second catalyst; mixing the medium boiling point fraction with the second catalyst; and separating the second catalyst from at least a portion of the second cracking reaction product.

A sixth aspect of the present disclosure may include any of the first through fifth aspects where at least 90 wt. % of the hydrocarbon material may be present in the combination of the lesser boiling point fraction, the medium boiling point fraction, and the greater boiling point fraction.

A seventh aspect of the present disclosure may include any of the first through sixth aspects where the first cracking reaction product and the second cracking reaction product may be combined to form a combined reaction product; and the combined reaction product may be separated into the petrochemical products.

An eighth aspect of the present disclosure may include any of the first through seventh aspects where the second reactor unit may comprise a catalyst mixing zone and a cracking reaction zone.

A ninth aspect of the present disclosure may include any of the first through eighth aspects where at least 40 wt. % of the combination of the first cracking reaction product, the second cracking reaction product, or both, may comprise ethylene, propene, butene, or pentene, or combinations of these.

A tenth aspect of the present disclosure may include any of the first through ninth aspects wherein a cut point of the lesser boiling point fraction and the medium boiling point fraction may be from 140° C. to 175° C.

An eleventh aspect of the present disclosure may include any of the first through tenth aspects where a cut point of the medium boiling point fraction and the greater boiling point fraction may be from 300° C. to 450° C.

In a twelfth aspect of the present disclosure, a hydrocarbon feed conversion system for producing a petrochemical product stream from a hydrocarbon feed stream may be operated by a process that may comprise: introducing the hydrocarbon feed stream to a feed separator; separating the hydrocarbon feed stream into at least a lesser boiling point fraction stream, a medium boiling point fraction stream, and a greater boiling point fraction stream in the feed separator; passing the greater boiling point fraction stream to a first fluidized catalytic cracking unit; passing the lesser boiling point fraction stream and the medium boiling point fraction stream to a second fluidized catalytic cracking unit, wherein the lesser boiling point fraction stream is passed into the second fluidized catalytic cracking unit upstream of the medium boiling point fraction stream; cracking at least a portion of the greater boiling point fraction stream in the first fluidized catalytic cracking unit in the presence of a first catalyst at a reaction temperature of from 500° C. to 700° C. to produce a first cracking reaction product stream; cracking at least a portion of the lesser boiling point fraction stream and the medium boiling point fraction stream in the second fluidized catalytic cracking unit in the presence of a second catalyst and at a reaction temperature of from 500° C. to 700° C. to produce a second cracking reaction product stream; and separating the petrochemical product stream from one or both of the first cracking reaction product stream or the second cracking reaction product stream.

A thirteenth aspect of the present disclosure may include the twelfth aspect where at least 90 wt. % of the hydrocarbon feed stream may be present in the combination of the lesser boiling point fraction, the medium boiling point fraction, and the greater boiling point fraction.

A fourteenth aspect of the present disclosure may include either of the twelfth or thirteenth aspects where the hydrocarbon feed stream has composition of the difference between the 5 wt. % boiling point and the 95 wt. % boiling point of the hydrocarbon feed stream is at least 100° C.

A fifteenth aspect of the present disclosure may include any of the twelfth through fourteenth aspects where a cut point of the lesser boiling point fraction stream and the medium boiling point fraction stream may be from 140° C. to 175° C., and wherein a cut point of the medium boiling point fraction and the greater boiling point fraction may be from 300° C. to 450° C.

A sixteenth aspect of the present disclosure may include any of the twelfth through fifteenth aspects where the second fluidized catalytic cracking unit may comprise: a catalyst mixing zone; a cracking reaction zone; and a separation zone.

A seventeenth aspect of the present disclosure may include any of the twelfth through sixteenth aspects where the lesser boiling point fraction stream may be initially exposed to greater temperatures in the second reactor unit, initially may have a greater catalyst:oil ratio in the second reactor unit, may have a greater residence time in the second reactor unit, or combinations thereof, as compared to the medium boiling point fraction stream.

An eighteenth aspect of the present disclosure may include any of the twelfth through seventeenth aspects where the first cracking reaction product stream and the second cracking reaction product stream may be combined to form a combined reaction product stream; and the combined reaction product stream may be separated into the petrochemical product stream.

A nineteenth aspect of the present disclosure may include any of the twelfth through eighteenth aspects where the hydrocarbon feed stream may be crude oil.

A twentieth aspect of the present disclosure may include any of the twelfth through nineteenth aspects where at least 40 wt. % of the combination of the first cracking reaction product stream, the second cracking reaction product stream, or both, comprises at least one of ethylene, propene, butene, or pentene.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A process for producing petrochemical products from a hydrocarbon material, the process comprising:
    separating the hydrocarbon material into at least a lesser boiling point fraction, a medium boiling point fraction, and a greater boiling point fraction;
    cracking at least a portion of the greater boiling point fraction in the presence of a first catalyst in a first reactor unit at a reaction temperature of from 500° C. to 700° C. to produce a first cracking reaction product;
    cracking at least a portion of the lesser boiling point fraction and the medium boiling point fraction in a second reactor unit in the presence of a second catalyst at a reaction temperature of from 500° C. to 700° C. to produce a second cracking reaction product, wherein the lesser boiling point fraction enters the second reactor unit upstream of wherein the medium boiling point fraction enters the second reactor; and
    separating the petrochemical products from one or both of the first cracking reaction product or the second cracking reaction product,
    wherein the lesser boiling point fraction is initially exposed to greater temperatures in the second reactor unit, initially has a greater catalyst:oil ratio in the second reactor unit, has a greater residence time in the second reactor unit, or combinations thereof, as compared to the medium boiling point fraction.

2. The process of claim 1, wherein the hydrocarbon material is crude oil.

3. The process of claim 1, further comprising:
    mixing the greater boiling point fraction with the first catalyst to crack at least a portion of the greater boiling point fraction; and
    separating the first catalyst from at least a portion of the first cracking reaction product.

4. The process of claim 1, further comprising:
    mixing the lesser boiling point fraction with the second catalyst;
    mixing the medium boiling point fraction with the second catalyst; and
    separating the second catalyst from at least a portion of the second cracking reaction product.

5. The process of claim 1, wherein at least 90 wt. % of the hydrocarbon material is present in the combination of the lesser boiling point fraction, the medium boiling point fraction, and the greater boiling point fraction.

6. The process of claim 1, wherein:
    the first cracking reaction product and the second cracking reaction product are combined to form a combined reaction product; and
    the combined reaction product is separated into the petrochemical products.

7. The process of claim 1, wherein the second reactor unit comprises a catalyst mixing zone and a cracking reaction zone.

8. The process of claim 1, wherein at least 40 wt. % of the combination of the first cracking reaction product, the second cracking reaction product, or both, comprises ethylene, propene, butene, or pentene, or combinations of these.

9. The process of claim 1, wherein a cut point of the lesser boiling point fraction and the medium boiling point fraction is from 140° C. to 175° C.

10. The process of claim 1, wherein a cut point of the medium boiling point fraction and the greater boiling point fraction is from 300° C. to 450° C.

11. A process for operating a hydrocarbon feed conversion system for producing a petrochemical product stream from a hydrocarbon feed stream, the process comprising:
    introducing the hydrocarbon feed stream to a feed separator;
    separating the hydrocarbon feed stream into at least a lesser boiling point fraction stream, a medium boiling point fraction stream, and a greater boiling point fraction stream in the feed separator;
    passing the greater boiling point fraction stream to a first fluidized catalytic cracking unit;
    passing the lesser boiling point fraction stream and the medium boiling point fraction stream to a second fluidized catalytic cracking unit, wherein the lesser boiling point fraction stream is passed into the second fluidized catalytic cracking unit upstream of the medium boiling point fraction stream;
    cracking at least a portion of the greater boiling point fraction stream in the first fluidized catalytic cracking unit in the presence of a first catalyst at a reaction temperature of from 500° C. to 700° C. to produce a first cracking reaction product stream;
    cracking at least a portion of the lesser boiling point fraction stream and the medium boiling point fraction stream in the second fluidized catalytic cracking unit in the presence of a second catalyst and at a reaction temperature of from 500° C. to 700° C. to produce a second cracking reaction product stream; and
    separating the petrochemical product stream from one or both of the first cracking reaction product stream or the second cracking reaction product stream, wherein the lesser boiling point fraction stream is initially exposed to greater temperatures in the second reactor unit, initially has a greater catalyst:oil ratio in the second reactor unit, has a greater residence time in the second reactor unit, or combinations thereof, as compared to the medium boiling point fraction stream.

12. The process of claim 11, wherein at least 90 wt. % of the hydrocarbon feed stream is present in the combination of the lesser boiling point fraction, the medium boiling point fraction, and the greater boiling point fraction.

13. The process of claim 11, wherein a difference between the 5 wt. % boiling point and the 95 wt. % boiling point of the hydrocarbon feed stream is at least 100° C.

14. The process of claim 11, wherein a cut point of the lesser boiling point fraction stream and the medium boiling point fraction stream is from 140° C. to 175° C., and wherein a cut point of the medium boiling point fraction and the greater boiling point fraction is from 300° C. to 450° C.

15. The process of claim 11, wherein the second fluidized catalytic cracking unit comprises:
   a catalyst mixing zone;
   a cracking reaction zone; and
   a separation zone.

16. The process of claim 11, wherein:
   the first cracking reaction product stream and the second cracking reaction product stream are combined to form a combined reaction product stream; and
   the combined reaction product stream is separated into the petrochemical product stream.

17. The process of claim 11, wherein the hydrocarbon feed stream is crude oil.

18. The process of claim 11, wherein at least 40 wt. % of the combination of the first cracking reaction product stream, the second cracking reaction product stream, or both, comprises at least one of ethylene, propene, butene, or pentene.

19. The process of claim 1, wherein each of the first reactor unit and the second reactor unit is a downflow reactor.

20. The process of claim 11, wherein each of the first fluidized catalytic cracking unit and the second fluidized catalytic cracking unit is a downflow fluidized catalytic cracking unit.

\* \* \* \* \*